Figure 1:
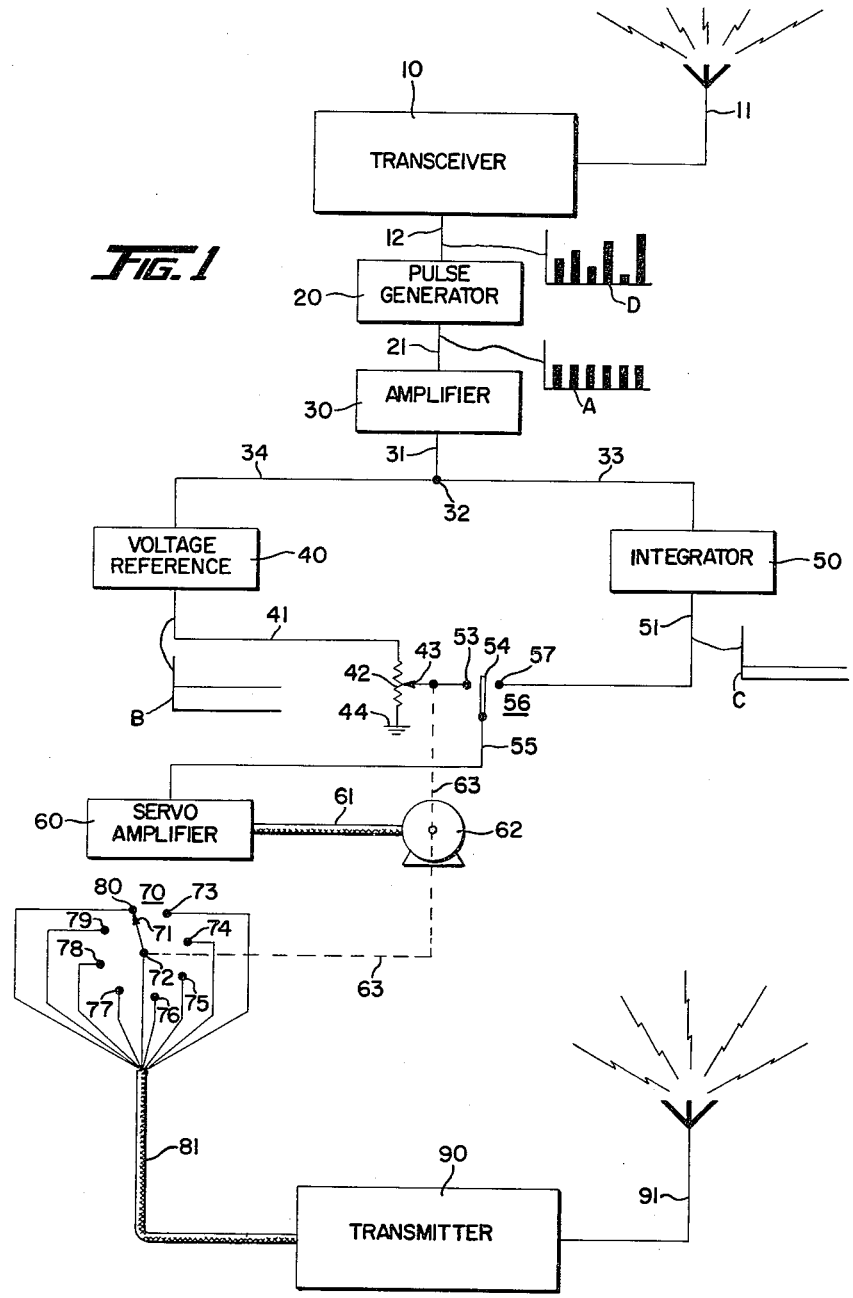

Oct. 10, 1961     M. R. LUDWIG     3,004,198
PULSE FREQUENCY CONTROLLED SERVOSYSTEM
Filed May 19, 1958     2 Sheets-Sheet 1

INVENTOR.
MERLE R. LUDWIG
BY
ATTORNEY

Oct. 10, 1961 M. R. LUDWIG 3,004,198
PULSE FREQUENCY CONTROLLED SERVOSYSTEM
Filed May 19, 1958 2 Sheets-Sheet 2
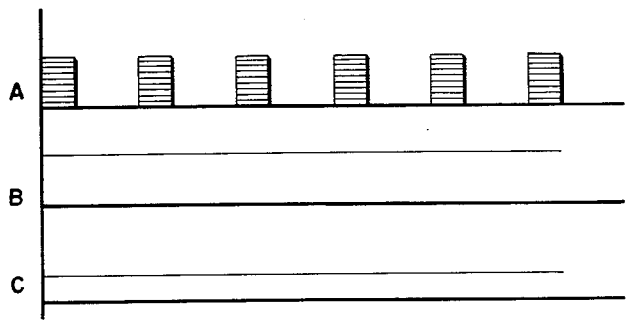
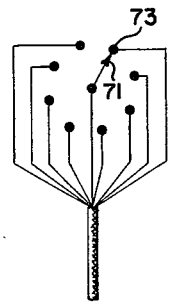
Fig. 2
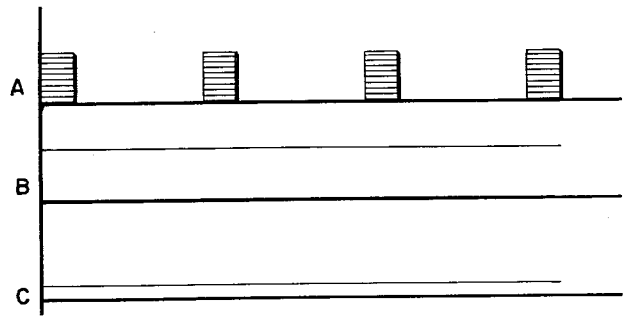
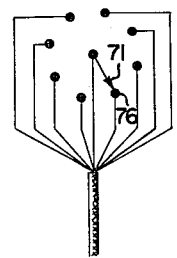
Fig. 3
INVENTOR.
MERLE R. LUDWIG
BY
ATTORNEY

United States Patent Office 3,004,198
Patented Oct. 10, 1961

3,004,198
PULSE FREQUENCY CONTROLLED
SERVOSYSTEM
Merle R. Ludwig, Golden Valley, Minn., assignor to
Minneapolis-Honeywell Regulator Company, Minneapolis, Minn., a corporation of Delaware
Filed May 19, 1958, Ser. No. 736,354
6 Claims. (Cl. 318—28)

This invention relates generally to the art of telemetering certain types of information from one point to another and is more particularly related to telemetering apparatus in which a conversion from one form of information to another form of information is desirable so as to provide a more efficient and intelligible operation.

As a specific example of an apparatus in the prior art that utilize telemetering principles, consider the transonde altimeter system in which a radio altimeter is utilized to actuate the transmitter to send signals back to earth that are indicative of the altitude of the transonde altimeter. These systems generally consisted of a radio altimeter which is essentially a self-pulsing transceiver that emits a pulse of energy toward the ground upon reception of a pulse of energy reflected from the ground so that the pulse repetition rate, or frequency of operation, is dependent on, or inversely proportional to, the distance above the ground. This frequency was then applied directly to a transmitter which sent the signal to a ground receiver that had associated with it some means for determining the frequency of operation of the radio altimeter thereby determining the altitude. This type of system has not been completely satisfactory in that the pulse repetition frequency associated with the altitudes usually encountered with a transonde altimeter is of a magnitude such that a significant proportion of the intelligence of the signal is lost in the transmission at the original frequency of the signal from the altimeter to the ground receiving station. Further, at times it becomes necessary for security reasons to prevent the ready access to the information being transmitted by anyone who is equipped with a ground receiver so that it is desirable to provide a method and means for coding the intelligence to prevent its unauthorized reception and use. By utilizing the principles of my invention, I provide an apparatus which not only increases the efficiency and amount of intelligence that may be transmitted, but also contains a flexibility operation that has not, up to the present time, been obtained.

Therefore, it is an object of my invention to provide an improved telemetering apparatus.

It is a further object of my invention to provide an intelligence telemetering system.

It is a still further object of my invention to provide a new and novel apparatus for converting pulse repetition rate to a positional output for use in apparatus described above and others.

These and other objects of my invention will become apparent to one skilled in the art from a reading of the appended application and drawing in which:

FIGURE 1 is a schematic and block diagram of a telemetering system embodying the principles of my invention; and FIGURES 2 and 3 are graphic diagrams provided to illustrate the operation of the embodiment of FIGURE 1.

FIGURE 1 shows a transceiver 10 adapted to provide a variable frequency pulse signal to pulse generator 20, and in turn to amplifier 30. The output of amplifier 30 is connected to a voltage regulator or voltage reference 40 and an integrator 50 which are in turn connected to stationary contacts of single pole double throw switch 56. A reversible motor means 62 is controlled from servo amplifier 60 that is responsive to the signal supplied to it from single pole double throw switch 56. Reversible motor means 62 is used to control the position of the rotary contact 71 on switching means 70 that is adapted to co-act with transmitter 90 to thereby control the signal being transmitted to a remote observing station (not shown).

Transceiver 10 may be of the type well known in the art that utilizes what is described as a "ring around" principle of operation in which the frequency of operation of the transceiver is determined by the time it takes for a transmitted pulse to return from a reflecting object at a remote point from the transceiver. On reception of a reflected pulse, another pulse is transmitted so that the pulse repetition frequency will be inversely proportional to the distance of the transceiver from a particular reflecting object, which may be for example, the earth in the case of a radio altimeter. Transceiver 10 is shown with a transmitting antenna and receiving antenna 11. The output of transceiver 10 is connected to a pulse generator 20 through a conductor 12. An example of a wave form that might appear at the output of transceiver 10 is shown in diagram D as a series of pulses of a particular frequency but which may vary in a particular amplitude.

Pulse generator 20 is utilized in this embodiment to provide output of pulses of uniform magnitude and energy in response to an input of pulses of the regular pulse generator 20 may be seen at diagram A. An example of the device that might be used for generator 20 is the well known monostable multi-vibrator that provides an output of uniform energy and constant magnitude in response to a pulse signal input.

The output of pulse generator 20 is connected to amplifier 30 through lead 21. Amplifier 30 may be any suitable form of amplifier for providing substantially distortionless amplification of the input signal. The output of amplifier 30 is connected to a voltage regulator or voltage reference 40 through lead 31, terminal 32 and lead 34 and to an integrator 50 through lead 31, terminal 32 and lead 33.

Voltage regulator 40 may be any device using expedients well known to those skilled in the art for providing a constant potential output of a magnitude equal to the peak amplitude of the constant magnitude variable frequency pulse signal. A representation of the output of voltage regulator 40 is diagrammatically shown by plot B of FIG. 1.

Integrator 50 may also utilize expedients well known to those skilled in the art for integrating or averaging the energy contained in the pulse signal. An example of what might be the output of integrator 50 in response to the signal shown at diagram A, as shown in diagram C. The output of voltage regulator or voltage reference 40 is connected to ground through lead 41, potentiometer 42 and ground terminal 44. Potentiometer wiper 43, associated with potentiometer winding 42, is connected to stationary contact 53 on single pole double throw switch 56, servo amplifier 60 and reversible motor means 62 are utilized to position potentiometer wiper 43 on potentiometer winding 42 so that the potential appearing at the wiper 43 is the same as the potential supplied by integrator 50. Movable contact 54 is connected to servo amplifier 60 through a lead 55. Servo amplifier 60 is connected to motor means 62 through a cable 61. The output of motor means 62 is mechanically connected to potentiometer wiper 43 through driving means 63. (Driving means 63 may include suitable speed reduction apparatus not shown.) It should be apparent to one skilled in the art that single pole double throw switching means 56 may be of the type known as choppers or synchronous switches so that the servo amplifier, when suitably energized, may control the operation of reversible motor means 62 such that the desired balance of the servo system may be attained in the shortest possible time with due regard for stability of the system.

Operatively connected to the output of motor means 62 is rotary switching means 70 including a wiper or movable contact 71, connected to motor 62 through driving means 63, and stationary contacts, 73, 74, 75, 76, 77, 78, 79, and 80. A contact 72 provides for electrical connection to movable contact 71. It should therefore be apparent that the movable contact 71 is positioned in accordance with the position of potentiometer wiper 43.

Rotary switching device 70 is shown connected to cable 81 that is connected to the input of a transmitter 90 so as to control the operation thereof according to any desired function. The output of transmitter 90 is applied to an antenna 91 for transmission to remote observation points.

*Operation of FIGURE 1*

In considering the operation of FIGURE 1, reference is made to the graphic diagram shown in FIGURES 2 and 3 for a qualitative pictorial representation of the significant wave forms shown in diagrams A, B, and C of FIGURE 1 (like reference characters are used for like diagrams in FIGURES 2 and 3).

Considering the situation illustrated by the diagrams in FIGURE 2, a train of pulses of the frequency and magnitude illustrated in diagram A of FIGURE 2 will result in a voltage or potential shown in diagram B being applied across potentiometer winding 42 and a voltage or potential, as shown in diagram C of FIGURE 2, is supplied from the output of integrator 50 to the synchronous switch 56. The operation of the servo system will be such as to cause the wiper 43 to be positioned at some particular point on potentiometer winding 42 so that the potential appearing at that point is equal to the potential supplied from the output of integrator 50. This may be considered to be a shaft position of driving means 63 that is proportional to the particular frequency of the train of pulses shown in diagram A of FIGURE 2 and, as an example, further shows the stationary contact 73 connected to the movable contact 71 on switching means 70 so as to cause a particular operation of the transmitter 90.

FIGURE 3 shows, in diagram A, a signal of a different frequency that results in the same potential supplied from the voltage regulator as shown on diagram B but a different potential supplied from the integrator 50 as shown at diagram C of FIGURE 3. Again, the servo system is operative to position the potentiometer wiper 43 at a proper location on potentiometer winding 42 so as to equalize the potential appearing thereon with the potential supplied from the integrator 50. This, for example may be a shaft position for driving means 63 corresponding to the connection of stationary contact 76 with movable contact 71 on switching means 70 as shown on FIGURE 3, which would result in a different operation of the transmitter 90 according to the particular devices and methods used for controlling the operation of the transmitter in accordance with the position of the movable wiper 71 on the switching means 70.

It should now be apparent to those skilled in the art that various other devices and apparatus may be utilized in practicing the principles of my invention and I therefore wish to be limited only by the scope of the appended claims.

I claim:

1. Apparatus of the class described, means for positioning a device to be controlled in accordance with the pulse repetition rate of a source of signal that may vary in frequency comprising; first means for generating a potential proportional to the magnitude of a pulse signal of variable frequency; second means for providing a potential equal to the average value of said pulse signal; potentiometer means having a wiper operatively connected to a reversible motor means; means connecting said potentiometer means to said first means; comparison means for comparing the potential on said wiper and from said second means; and servo means, including said reversible motor means, for positioning said wiper on said potentiometer means in accordance with the potential from said second means.

2. Apparatus for converting anologue to shaft position information comprising; a first source of signal of variable frequency; rotatable means to be variably positioned in accordance with the variation in frequency of said signal; means responsive to said first signal for providing a second signal of predetermined constant magnitude; means responsive to said first signal for providing a third signal of varying magnitude in accordance with the variation in frequency of said signal; and servo means for positioning said rotatable means in accordance with the ratio between said second and third signals.

3. Apparatus for converting anologue to shaft position information comprising; a first source of signal of variable frequency; rotatable means to be variably positioned in accordance with the variation in frequency of said signal; means responsive to said first signal for providing a second signal of predetermined constant magnitude; means responsive to said first signal for providing a third signal of varying magnitude in accordance with the variation in frequency of said signal; comparison means connected to said second and third sources of signal; and means controlled by said comparison means for positioning said rotatable means in accordance with said second and third signals.

4. Apparatus for positioning a rotatable shaft in accordance with the frequency of a source of variable frequency energy comprising; first means responsive to a source of signal of variable frequency for providing a unidirectional reference potential substantially equal to the magnitude of said signal; second means responsive to said signal for providing a unidirectional potential of a magnitude proportional to the frequency of said signal; and servo means connected to said first and second means and responsive to the outputs of said first and second means for rotatably positioning a shaft in accordance with the ratio between the outputs of said first and second means.

5. Control apparatus comprising; a device to be controlled in accordance with a pulse signal of constant amplitude and variable frequency; means integrating said signal; means generating a further reference signal of amplitude proportional to the amplitude of said pulse signal; and means responsive to said integrated signal and said further reference signal and operative to control the operation of said controlled device in accordance with the ratio of said integrated and reference signals.

6. In apparatus of the class described, the method of converting a pulse signal of variable frequency to a positional signal that comprises the steps of comparing the integrated value of said pulse signal to a reference signal that is proportional to the peak amplitude of said signal to provide a further positional signal that is proportional to the ratio between said average value and said reference signal.

References Cited in the file of this patent

UNITED STATES PATENTS

| | | |
|---|---|---|
| 2,495,690 | Bradley | Jan. 31, 1950 |
| 2,668,264 | Williams | Feb. 2, 1954 |

OTHER REFERENCES

Grey, Alexander: Principles and Practice of Electrical Engineering, McGraw-Hill, 1917, page 198, sec. 231.

Lawrence, Ralph R.: Principles of Alternating Currents, first edition, page 36, McGraw-Hill, N.Y., 1922.